United States Patent
Schrum, Jr.

(10) Patent No.: US 9,025,603 B2
(45) Date of Patent: May 5, 2015

(54) ADDRESSING SCHEME FOR HYBRID COMMUNICATION NETWORKS

(75) Inventor: Sidney B. Schrum, Jr., Ocala, FL (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 13/189,272

(22) Filed: Jul. 22, 2011

(65) Prior Publication Data

US 2012/0230343 A1    Sep. 13, 2012

Related U.S. Application Data

(60) Provisional application No. 61/450,462, filed on Mar. 8, 2011.

(51) Int. Cl.
*H04B 3/36* (2006.01)
*H04L 29/12* (2006.01)
*H04L 12/54* (2013.01)

(52) U.S. Cl.
CPC ........ *H04L 61/6077* (2013.01); *H04L 12/5692* (2013.01); *H04L 61/103* (2013.01)

(58) Field of Classification Search
CPC ..... H04L 12/28; H04L 12/56; H04L 12/5692; H04L 29/12028; H04L 29/12952; H04L 61/103; H04L 61/6077
USPC .......... 370/351, 389, 392, 400, 401, 402, 404
See application file for complete search history.

(56) References Cited

U.S. PATENT DOCUMENTS

| 6,130,896 | A  | 10/2000 | Lueker et al. |
| 6,272,551 | B1 | 8/2001  | Martin et al. |

(Continued)

FOREIGN PATENT DOCUMENTS

| JP | 2008289146 | 11/2008 |
| JP | 2009253578 | 10/2009 |

(Continued)

OTHER PUBLICATIONS

Blanchet M., et al., "Multiple Interfaces and Provisioning Domains Problem Statement; draft-ietf-mif-problem-statement-09.txt", Internet Engineering Task Force, IETF; Standardworkingdraft, Internet Society (ISOC) 4, Rue Des Falaises CH-1205 Geneva, Switzerland, No. 9, Oct. 25, 2010, pp. 1-18, XP015072215, [retrieved on Oct. 25, 2010] Sections 3 to 5 (incl. sub-sections).

(Continued)

*Primary Examiner* — Andrew Chriss
*Assistant Examiner* — Rasha Fayed
(74) *Attorney, Agent, or Firm* — DeLizio Gilliam, PLLC

(57) ABSTRACT

A hybrid network device can implement an address management scheme for maintaining consistency between source/destination addresses and corresponding source/destination communication interfaces. In one embodiment, a first network device can select a first network path from a plurality of network paths associated with the communication network for transmitting a packet to a second network device. A source address can be determined from a plurality of addresses associated with a plurality of communication interfaces of the first network device. A destination address can be determined from a plurality of addresses associated with a plurality of communication interfaces of the second network device based, in part, on the selected first network path. The packet including at least the source address and the destination address can be transmitted via the first network path from a source communication interface of the first network device to a destination communication interface of the second network device.

29 Claims, 5 Drawing Sheets

(56) References Cited

U.S. PATENT DOCUMENTS

| | | | |
|---|---|---|---|
| 6,421,751 | B1 | 7/2002 | Gulick |
| 6,765,927 | B1* | 7/2004 | Martin et al. .................. 370/469 |
| 6,947,736 | B2 | 9/2005 | Shaver et al. |
| 7,082,134 | B1 | 7/2006 | Lim et al. |
| 7,113,763 | B2 | 9/2006 | Heinonen et al. |
| 7,262,695 | B2 | 8/2007 | Hicks |
| 7,269,403 | B1 | 9/2007 | Miao |
| 7,349,325 | B2 | 3/2008 | Trzeciak et al. |
| 7,391,317 | B2 | 6/2008 | Abraham et al. |
| 7,440,443 | B2 | 10/2008 | Logvinov et al. |
| 7,463,588 | B1* | 12/2008 | Tanaka et al. .................. 370/238 |
| 7,583,952 | B2 | 9/2009 | Lee et al. |
| 7,725,096 | B2 | 5/2010 | Riveiro et al. |
| 7,751,414 | B2 | 7/2010 | Lee et al. |
| 7,848,337 | B1 | 12/2010 | Weng et al. |
| 8,144,698 | B2* | 3/2012 | Sargor et al. .................. 370/389 |
| 8,284,694 | B2* | 10/2012 | Chari et al. .................. 370/252 |
| 8,619,769 | B2* | 12/2013 | Sandstrom .................. 370/389 |
| 2004/0078460 | A1 | 4/2004 | Valavi et al. |
| 2004/0133704 | A1 | 7/2004 | Krzyzanowski et al. |
| 2005/0013297 | A1* | 1/2005 | Eriksson .................. 370/392 |
| 2005/0265308 | A1* | 12/2005 | Barbir et al. .................. 370/351 |
| 2006/0015635 | A1 | 1/2006 | Fernandes et al. |
| 2006/0153153 | A1 | 7/2006 | Bhagwat et al. |
| 2006/0240799 | A1 | 10/2006 | Kim et al. |
| 2006/0245438 | A1 | 11/2006 | Sajassi et al. |
| 2006/0251115 | A1* | 11/2006 | Haque et al. .................. 370/466 |
| 2006/0274752 | A1* | 12/2006 | Jain et al. .................. 370/392 |
| 2007/0075843 | A1 | 4/2007 | Riveiro et al. |
| 2007/0076666 | A1 | 4/2007 | Riveiro et al. |
| 2007/0223399 | A1 | 9/2007 | Yang et al. |
| 2007/0229231 | A1 | 10/2007 | Hurwitz et al. |
| 2007/0280249 | A1* | 12/2007 | Draves .................. 370/392 |
| 2008/0080380 | A1 | 4/2008 | Lee et al. |
| 2008/0130640 | A1 | 6/2008 | Hurwitz et al. |
| 2008/0285441 | A1* | 11/2008 | Abdulla et al. .................. 370/225 |
| 2008/0317039 | A1* | 12/2008 | Satterlee et al. .................. 370/395.5 |
| 2009/0040938 | A1* | 2/2009 | Klinker .................. 370/252 |
| 2009/0046723 | A1 | 2/2009 | Rahman et al. |
| 2009/0156159 | A1 | 6/2009 | Lim et al. |
| 2009/0160943 | A1 | 6/2009 | Badt, Jr. et al. |
| 2009/0245243 | A1* | 10/2009 | Rangarajan et al. .......... 370/389 |
| 2009/0252209 | A1 | 10/2009 | Riveiro et al. |
| 2009/0268668 | A1* | 10/2009 | Tinnakornsrisuphap et al. .................. 370/328 |
| 2009/0285216 | A1* | 11/2009 | Thubert et al. .................. 370/392 |
| 2009/0310610 | A1* | 12/2009 | Sandstrom .................. 370/392 |
| 2009/0316584 | A1* | 12/2009 | Tanaka et al. .................. 370/238 |
| 2009/0323829 | A1 | 12/2009 | Riveiro et al. |
| 2010/0202397 | A1* | 8/2010 | Chari et al. .................. 370/329 |
| 2010/0332631 | A1* | 12/2010 | Sekine et al. .................. 709/222 |
| 2011/0063992 | A1 | 3/2011 | Weng et al. |
| 2011/0116513 | A1* | 5/2011 | Gilson .................. 370/469 |
| 2011/0286326 | A1* | 11/2011 | Awano .................. 370/225 |
| 2011/0286457 | A1* | 11/2011 | Ee et al. .................. 370/392 |
| 2012/0033673 | A1* | 2/2012 | Goel .................. 370/400 |
| 2012/0163389 | A1* | 6/2012 | Zhang et al. .................. 370/400 |
| 2012/0207163 | A1 | 8/2012 | Schrum |
| 2012/0224503 | A1 | 9/2012 | Schrum, Jr. et al. |
| 2013/0028135 | A1* | 1/2013 | Berman .................. 370/254 |
| 2013/0229909 | A1 | 9/2013 | Rahman et al. |

FOREIGN PATENT DOCUMENTS

| | | |
|---|---|---|
| JP | 2010141845 | 6/2010 |
| KR | 1010110008270 | 10/2009 |
| WO | 2009077292 | 6/2009 |
| WO | 2012122366 | 3/2012 |
| WO | 2012109622 | 8/2012 |
| WO | 2012118531 | 9/2012 |

OTHER PUBLICATIONS

Hong, Y.G (ETRI, Korea): "Output document of Y.ipv6-vmh "Framework of vertical multi-homing in IPv6-based NGN";TD 565 (NGN-GSI)", ITU-T Drafts ; Study Period 2009-2012, International Telecommunication Union, Geneva ; CH, vo. ngn-gsi ; 7/13, Sep. 16, 2010, pp. 1-19, XP917565748, [retrieved on Sep. 16, 2010] p. 7-p. 18.

International Search Report and Written Opinion—PCT/US2012/024763—ISAEPO—Apr. 18, 2012.

International Search Report and Written Opinion—PCT/US2012/028254—ISA/EPO—Sep. 6, 2012.

Wasserman M., et al., "Current Practices for Multiple Interface Hosts; draft-ietf-mif-current-practices-98.txt", Internet Engineering Task Force, I ETF; Standardworkingdraft, Internet Society (ISOC) 4, Rue Des Falaises CH-1205 Geneva, Switzerland, No. 8, Feb. 28, 2011, pp. 1-23, XP015074156, [retrieved on Feb. 28, 2011] Sections 1 to 3 (incl. sub-sections).

"HomePlug AV Specification", Version 1.1. Available from HomePlug Powerline Alliance http://www.homeplug.org May 21, 2007.

International Search Report and Written Opinion—PCT/US2011/058506—ISA/EPO—Feb. 7, 2012.

"Standard for a Convergent Digital Home Network for Heterogeneous Technologies", IEEE P1905.1 Project Authorization Request (PAR). Available from IEEE. Authorizes a standards development project to define an "abstraction layer" that provides a single common interface to upper layers for devices that implement multiple networking interfaces. Nov. 8, 2010.

IEEE , "Wireless LAN Medium Access Control (MAC) and Physical Layer (PHY) Specifications", IEEE Std 802.11-2007 (Revision of IEEE Std 802.11-1999 ) http://www.ahltek.com/WhitePapersdpf/802.11-20%20specs/802.11-2007.pdf Jun. 12, 2007 , 1232 pages.

Microsoft, "MS-LLTD Link Layer Topology Discovery (LLTD) Protocol Specification", http://msdn.microsoft.com/en-us/library/cc233983(v=prot.10).aspx Feb. 4, 2011 , 128 pages.

Volokitin,Yuriy , "LanTopolog", http://www.lantopolog.com/ Date Obtained from the Internet: Mar. 2, 2011 2007 , 2 pages.

Co-pending U.S. Appl. No. US 13/197,275, filed on Aug. 3, 2011, 37 pages.

Co-pending U.S. Appl. No. 13/295,704, filed Nov. 14, 2011, 34 pages.

Cisco Systems, Inc., , "Supported Platforms for Unique MAC Address Configuration on VLAN or L3 Interfaces for Catalyst Switches", URL: http://www.cisco.com/image/gif/paws/41263/catmac_41263.pdf retrieved on Feb. 13, 2013 Mar. 2, 2007, pp. 1-7.

"PCT Application No. PCT/US2012/028254 Written Opinion of the IPEA", Feb. 18, 2013 , 10 pages.

"PCT Application No. PCT/US2011/058506 International Preliminary Report on Patentability", Jul. 12, 2013 , 10 pages.

"PCT Application No. PCT/US2012/024763 International Preliminary Report on Patentability", Jun. 18, 2013 , 8 pages.

"PCT Application No. PCT/US2012/028254 International Preliminary Report on Patentability", May 10, 2013 , 11 pages.

"U.S. Appl. No. 13/197,275 Office Action", Sep. 20, 2013 , 27 pages.

"U.S. Appl. No. 13/197,275 Final Office Action", Apr. 24, 2014, 10 pages.

"Korean Patent Application No. 2013-7023974, KIPO Notice of Grounds for Rejection", Jul. 16, 2014, 7 pages.

"European Application No. 11859662.6, European Search Report", Jul. 17, 2014, 9 pages.

"Korean Patent Application No. 2013-7026010, KIPO Notice of Preliminary Rejection", Jul. 21, 2014, 12 pages.

"Korean Patent Application No. 2013-7026320, Notice of Grounds for Rejection", Aug. 11, 2014, 9 pages.

"TCP/IP Tutorial and Technical Overview", TCP/IP Tutorial and Technical Overview, XX, XX, Aug. 1, 2001, pp. 180-197.

Xi, et al., "Wireless Nultihop Internet Access: Gateway Discovery, Routing, and Addressing", Proceedings. International Conference on Third Generation Wireless and Beyond, May 28, 2002, pp. 1-6.

"Implementation of Extended ARP and High Performance LAN Communication in Linux Kernel", Technical Report of the Institute Electronics, Information and Communication Engineers, Feb. 7, 2002, vol. 101 No. 639, pp. 33-38.

"Japanese Patent Application No. 2013-553624, Office Action", Nov. 11, 2014, 6 pages.

"Japanese Patent Application No. 2013-557860, Office Action", Nov. 4, 2014, 6 pages.

"U.S. Appl. No. 13/295,704 Office Action", Feb. 27, 2015, 11 pages.

* cited by examiner

US 9,025,603 B2

ADDRESSING SCHEME FOR HYBRID COMMUNICATION NETWORKS

RELATED APPLICATION

This application claims the priority benefit of U.S. Provisional Application Ser. No. 61/450,462 filed on Mar. 8, 2011.

BACKGROUND

Embodiments of the inventive subject matter generally relate to the field of communication systems and, more particularly, to an addressing scheme for hybrid communication networks.

Hybrid communication networks (e.g., hybrid home networks) typically comprise multiple networking technologies (e.g., Wi-Fi®, HomePlug AV, Ethernet, etc.) that are interconnected using bridging-capable devices that forward packets between devices utilizing the different network technologies in order to form a single extended communication network. Typically, the communication mechanisms and protocol specifics (e.g., device and topology discovery protocols, bridging protocols, etc.) are unique to each networking technology. The hybrid communication network can comprise hybrid communication devices and conventional (or legacy) communication devices. The conventional communication devices typically implement a single networking interface that supports a single communication protocol (e.g., Internet Protocol—IPv4 or IPv6). On the other hand, the hybrid communication devices typically comprise multiple communication interfaces (e.g., each of which can support different communication technologies) that are configured to operate across multiple networking technologies.

SUMMARY

Various embodiments of an addressing scheme for hybrid communication networks are disclosed. In one embodiment, a first network device determines to transmit a packet from the first network device to a second network device of a communication network. A first network path is selected from a plurality of network paths associated with the communication network for transmitting the packet from the first network device to the second network device. A source address is determined from a plurality of addresses associated with a plurality of communication interfaces of the first network device. A destination address is determined from a plurality of addresses associated with a plurality of communication interfaces of the second network device based, at least in part, on the first network path selected for transmitting the packet from the first network device to the second network device. The packet including at least the source address associated with the first network device and the destination address associated with the second network device is transmitted via the first network path from a source communication interface of the first network device to a destination communication interface of the second network device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
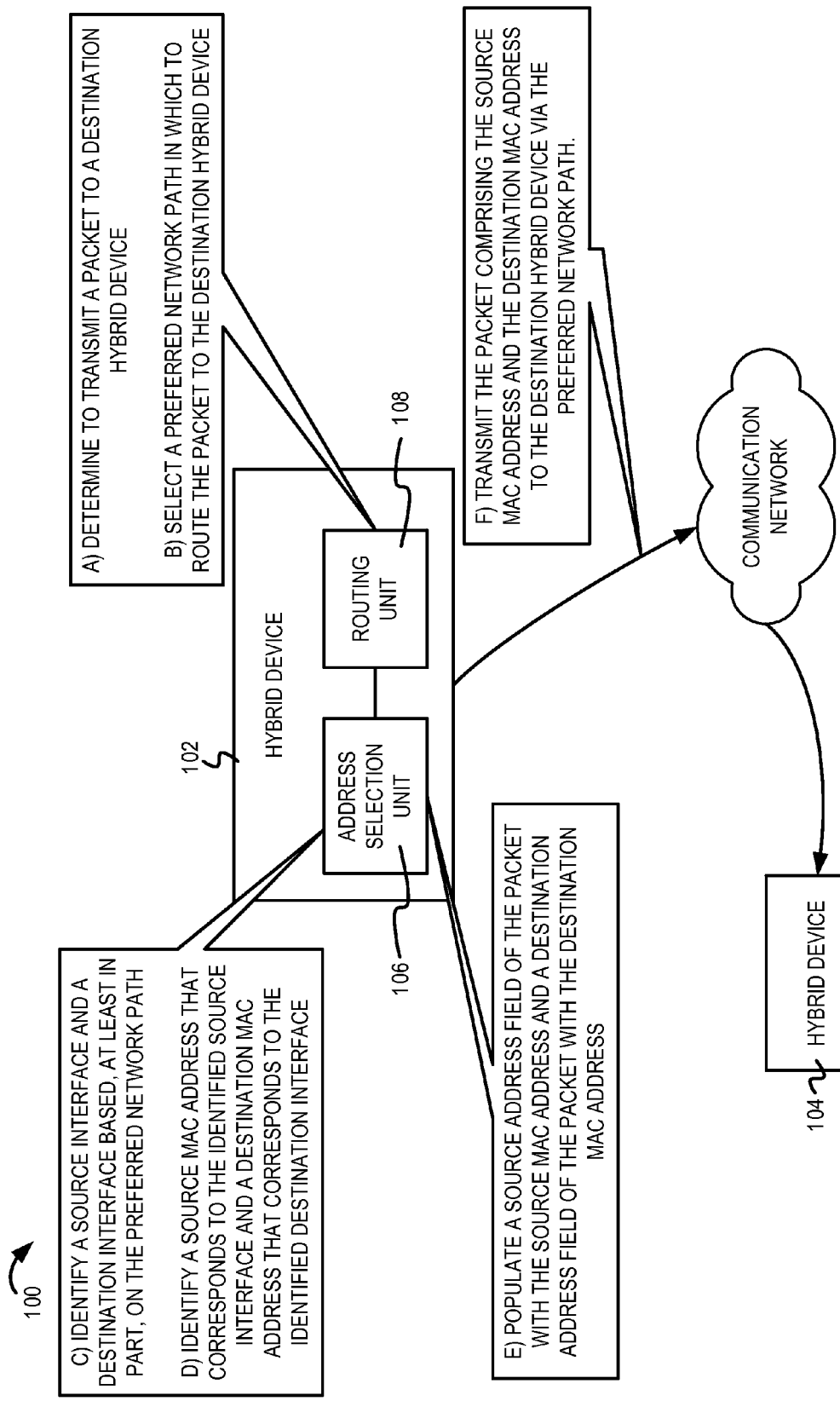
FIG. 1 is an example block diagram illustrating one embodiment of an addressing scheme for hybrid communication networks.

The description that follows includes exemplary systems, methods, techniques, instruction sequences, and computer program products that embody techniques of the present inventive subject matter. However, it is understood that the described embodiments may be practiced without these specific details. For instance, although in some embodiments the addressing scheme can be implemented for hybrid communication networks comprising wireless local area network (WLAN) devices (e.g., IEEE 802.11n), powerline network devices (e.g., Homeplug AV), coax network devices (MoCA), and Ethernet devices, in other embodiments the addressing scheme can be implemented in hybrid communication networks that may comprise other suitable types of network devices that implement other standards/protocols (e.g., WiMAX, etc.). In other instances, well-known instruction instances, protocols, structures, and techniques have not been shown in detail in order not to obfuscate the description.

A hybrid communication network is typically formed as an interconnection of communication networks (that support different communication protocols) across different network technologies and communication media. The hybrid communication network typically comprises hybrid devices that are configured to operate across the different network technologies. A hybrid device typically comprises multiple network interfaces—each of which is associated with a medium access control address (e.g., a MAC address). However, the hybrid device typically comprises one address associated with the network layer (e.g., an Internet Protocol (IP) address) of an Open Systems Interconnection (OSI) protocol stack, and therefore a 1:1 mapping between the network layer address and the MAC address may not exist. Likewise, the destination hybrid device could also comprise multiple communication interfaces, and therefore multiple destination MAC addresses associated with a single destination IP address. From the perspective of the upper layers in the OSI protocol stack (e.g., the application layer, the network layer, etc.), the hybrid device implementing multiple communication interfaces can appear to have a single underlying medium access control layer and a single physical layer (i.e., a single MAC/PHY layer) and consequently a single MAC address. Therefore, in some cases, the source MAC address field of a packet scheduled to be transmitted may be populated with a MAC address that does not correspond to the communication interface from which the packet will be transmitted ("source communication interface"). Likewise, the destination MAC address field of the packet scheduled to be transmitted may be populated with a MAC address that does not correspond to the communication interface of the destination hybrid device at which the packet will be received ("destination communication interface"). The destination hybrid device may filter/ discard each packet that is received at the destination communication interface with an incorrect destination MAC address. Furthermore, incorrect and inconsistent usage of the source MAC addresses and the destination MAC addresses in packets can also cause conventional learning bridges in the hybrid communication network to drop inconsistent packets, resulting in performance degradation.

In some embodiments, an address management scheme can be implemented by a hybrid device to handle the inconsistency between the upper layer protocol's perspective of a single communication interface and one-to-one mapping between IP and MAC addresses, and the reality of multiple interfaces and multiple MAC address associated with the hybrid device. In response to determining to transmit a packet to a destination hybrid device, a source hybrid device can select (from multiple available network paths between the source and the destination hybrid devices) a preferred network path in which to route the packet to the destination hybrid device. The source hybrid device can identify a source communication interface from which the packet will be transmitted and a destination communication interface on which the packet will be received at the destination hybrid device based, at least in part, on the preferred network path. The source hybrid device can then determine the underlying source MAC address and the destination MAC address associated with the source communication interface and the destination communication interface respectively. The source hybrid device can populate appropriate address fields of the packet with the source MAC address and the destination MAC address and can then transmit the packet to the destination hybrid device via the preferred network path. Such an addressing scheme can ensure that consistency between the source MAC address and the source communication interface and between the destination MAC address and the destination communication interface is maintained. The addressing scheme for hybrid communication networks does not bind applications to a single communication interface and can enable dynamic variations in the preferred network path between the source hybrid device and the destination hybrid device. The addressing scheme described herein may also be compatible with existing MAC address to device identifier mapping/translation mechanisms, packet filtering techniques, and forwarding protocols implemented by conventional learning bridges. This can minimize the probability of dropped packets and improve performance of the hybrid communication network.

FIG. 1 is an example block diagram illustrating one embodiment of an addressing scheme for hybrid communication networks. FIG. 1 depicts a hybrid communication network 100 comprising hybrid devices 102 and 104. The hybrid device 102 comprises an address selection unit 106 and a routing unit 108. Although not depicted in FIG. 1, the hybrid device 104 can also comprise an address selection unit and a routing unit. In some implementations, the hybrid devices 102 and 104 can implement the OSI protocol stack. In some implementations, from the perspective of the upper layers (e.g., the network layer, the transport layer, and the application layer) of the OSI protocol stack, the hybrid device 102 can appear to comprise a single underlying MAC/PHY layer, and therefore only one source MAC address to be populated in packets generated by the hybrid device 102. However, because the source hybrid device 102 implements multiple communication interfaces, the source hybrid device 102 can comprise multiple source MAC addresses (e.g., typically one source MAC address per source communication interface). Likewise, the destination hybrid device 104 can also comprise multiple destination MAC addresses associated with corresponding multiple destination communication interfaces. As will be described below in stages A-F of FIG. 1, the addressing unit 106 of the source hybrid device 102 can implement functionality to manage the inconsistency between the upper layers' perspective of a single communication interface and one-to-one mapping of addresses, and the reality of multiple communication interfaces and multiple MAC address associated with the hybrid device 102 by ensuring that a transmitted packet comprises the appropriate source and destination MAC addresses.

At stage A, the hybrid device 102 ("source hybrid device") determines to transmit a packet to the hybrid device 104 ("destination hybrid device"). For example, the routing unit 108 can receive a packet (e.g., from an application) that is to be transmitted to the destination hybrid device 104.

At stage B, the routing unit 108 selects a preferred network path in which to route the packet from the source hybrid device 102 to the destination hybrid device 104. In some implementations, the routing unit 108 can store an indication of one or more previously determined network paths between the source hybrid device 102 and the destination hybrid device 104. The one or more network paths can be determined based on the number of communication interfaces associated with the source hybrid device 102 and the destination hybrid device 104. For example, the number of network paths between the source hybrid device 102 and the destination hybrid device 104 may be N×M, where N are the number of communication interfaces associated with the source hybrid device 102 and M are the number of communication interfaces associated with the destination hybrid device 104. In some implementations, the routing unit 108 can select the preferred network path based on the topology of the hybrid communication network 100, the presence of legacy bridges and hybrid bridges in the hybrid communication network 100, forwarding tables associated with the legacy bridges and hybrid bridges, traffic on various communication links of the hybrid communication network 100, etc. After the preferred network path is selected, the address selection unit 106 can implement functionality to maintain consistency between the source and the destination communication interfaces and the source and destination MAC addresses in the packet, respectively, as will be described in stages C-F.

At stage C, the address selection unit 106 identifies a source communication interface and a destination communication interface based, at least in part, on the preferred network path. The preferred network path typically comprises a "first hop" link which is representative of the source communication interface through which the source hybrid device 102 will transmit the packet. Accordingly, the address selection unit 106 can select one of multiple communication interfaces associated with the source hybrid device 102 as the source communication interface via which to transmit the packet. In other embodiments, various other techniques can be employed to determine the source communication interface, as will be further described in FIG. 2. The preferred network path can also indicate a "last hop" link which is representative of the destination communication interface through which the destination hybrid device 104 will receive the packet. Accordingly, the address selection unit 106 can select one of multiple communication interfaces associated with the destination hybrid device 104 as the destination communication interface at which the destination hybrid device 104 is expected to receive the packet.

At stage D, the address selection unit 106 identifies a source MAC address that corresponds to the identified source communication interface and a destination MAC address that corresponds to the identified destination communication interface. The source and destination communication interfaces and consequently the source and destination MAC addresses can be selected in accordance with various criteria. In one example, the source MAC address and the destination MAC address can be selected based on previously determined associations (also known as mappings or translations) between various other types of addresses (e.g., an IP address) associated with the hybrid devices 102 and 104. As another example, the source MAC address and the destination MAC address can be selected based on the routing algorithm employed at the source hybrid device 102, the forwarding devices in the hybrid communication network 100, whether one or more of the forwarding devices are conventional learning bridges, forwarding tables (if any) associated with the forwarding devices, and other routing behavior of the forwarding devices. As another example, the source MAC address can be selected such that the source MAC address is received at the appropriate "learned" port of the conventional learning bridge to minimize the possibility of the packet being dropped at the conventional learning bridge. In other embodiments, various other techniques can be employed to determine the source MAC address and the destination MAC address, as will be further described in FIG. 2.

At stage E, the address selection unit 106 populates a source address field of the packet with the source MAC address and a destination address field of the packet with the destination MAC address. In one example, the packet to be transmitted by the source hybrid device 102 can comprise fields for the destination MAC address, the source MAC address, the destination network address, and the source network address. In one implementation, the source and destination network addresses can be Internet Protocol version 4 (IPv4) addresses, IP version 6 (IPv6) addresses, AppleTalk addresses, or other suitable network addresses depending on the network layer protocols implemented by the source and destination hybrid devices 102 and 104. The source and the destination MAC addresses can indicate the communication interface on which the source hybrid device 102 and the destination hybrid device 104 will transmit and receive the packet respectively. The address selection unit 106 can populate the source MAC address field and the destination MAC address field with the source MAC address and the destination MAC address respectively (determined at stage D). In some implementations, as will be further described in FIG. 2, the address selection unit 106 can read an original source MAC address (e.g., which may be selected as a default address associated with the destination hybrid device 104 by upper protocol layers) from the packet and can compare the original source MAC address against the source MAC address (determined at stage D) that corresponds to the selected source communication interface. The address selection unit 106 can overwrite the source MAC address field in the packet with the source MAC address that corresponds to the selected source communication interface if there is a mismatch. Likewise, the address selection unit 106 can overwrite the destination MAC address field in the packet with the destination MAC address (determined at stage D) that corresponds to the selected destination communication interface if there is a mismatch between the original destination MAC address in the packet and the destination MAC address that corresponds to the selected destination communication interface. Additionally, in some implementations, the address selection unit 106 can ensure that the packet also comprises the source IP address assigned to the source hybrid device 102, the destination IP address assigned to the destination hybrid device 104, the source device identifier assigned to the source hybrid device 102, and the destination device identifier assigned to the destination hybrid device 104.

At stage F, the source hybrid device 102 transmits the packet comprising the source MAC address and the destination MAC address to the destination hybrid device 104 via the preferred network path.

Figure 2:
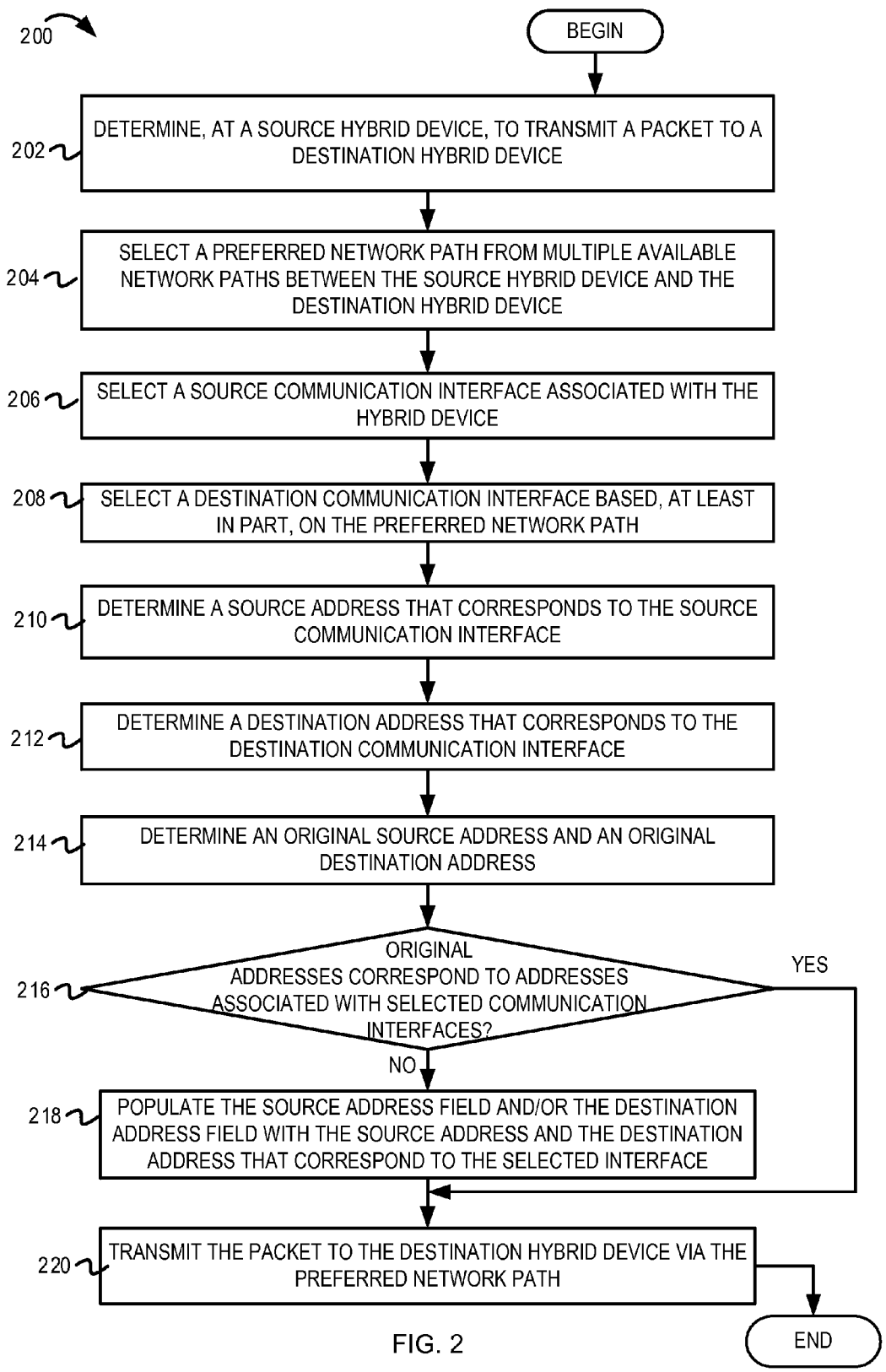
FIG. 2 is a flow diagram illustrating example operations of a addressing scheme for a hybrid communication network.

FIG. 2 is a flow diagram ("flow") 200 illustrating example operations of an addressing scheme for a hybrid communication network. The flow 200 begins at block 202.

At block 202, a source hybrid device determines to transmit a packet to a destination hybrid device. In the example of FIG. 1, the routing unit 108 of the source hybrid device 102 can determine to transmit the packet to the destination hybrid device 104. The flow continues at block 204.

Figure 3A:
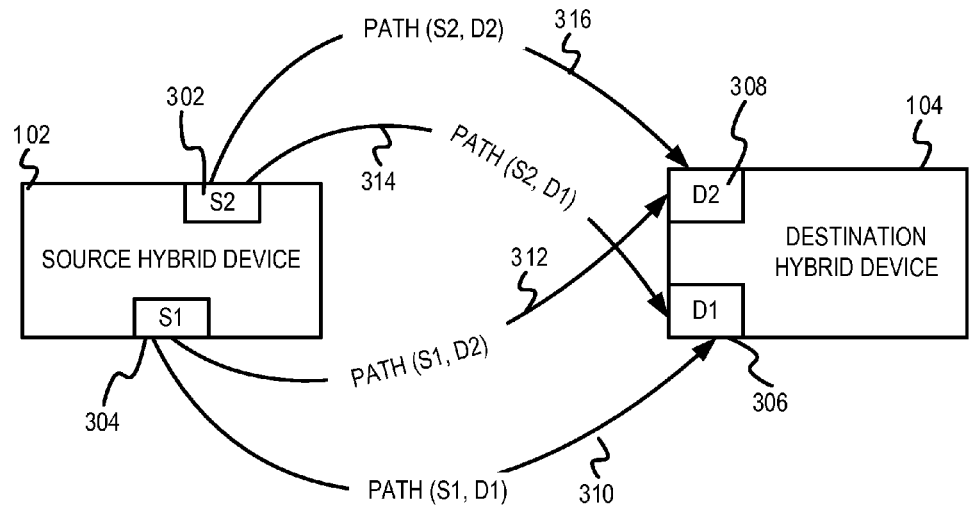
FIG. 3A is an example conceptual diagram illustrating a plurality of network paths between a source hybrid device and a destination hybrid device.

At block 204, a preferred network path is selected from multiple available network paths between the source hybrid device and the destination hybrid device. For example, the routing unit 108 can select the preferred network path in which to transmit the packet from the source hybrid device 102 to the destination hybrid device 104. In some implementations, the multiple network paths may be as a result of the topology of the hybrid communication network 100 and the forwarding capabilities of bridging devices in the hybrid communication network 100. The number of available network paths between the source hybrid device 102 and the destination hybrid device 104 may also be dependent on the number of communication interfaces associated with the source hybrid device 102 and the destination hybrid device 104. FIG. 3A is an example conceptual diagram illustrating multiple network paths between the source hybrid device 102 and the destination hybrid device 104. In one example, as depicted in FIG. 3A, the source hybrid device 102 comprises two communication interfaces S1 304 and S2 302. The destination hybrid device 104 also comprises two communication interfaces D1 306 and D2 308. Accordingly, in this example, there can be four possible network paths between the source hybrid device 102 and the destination hybrid device 104. The four network paths are represented as path (S1, D1) 310, path (S1, D2) 312, path (S2, D1) 314, and path (S2, D2) 316. More generically, the minimum number of network paths available for routing the packet from the source hybrid device 102 to the destination hybrid device 104 can be represented as N×M, where N represents the number of communication interfaces associated with the source hybrid device 102 and M represents the number of communication interfaces associated with the destination hybrid device 104.

Figure 3B:
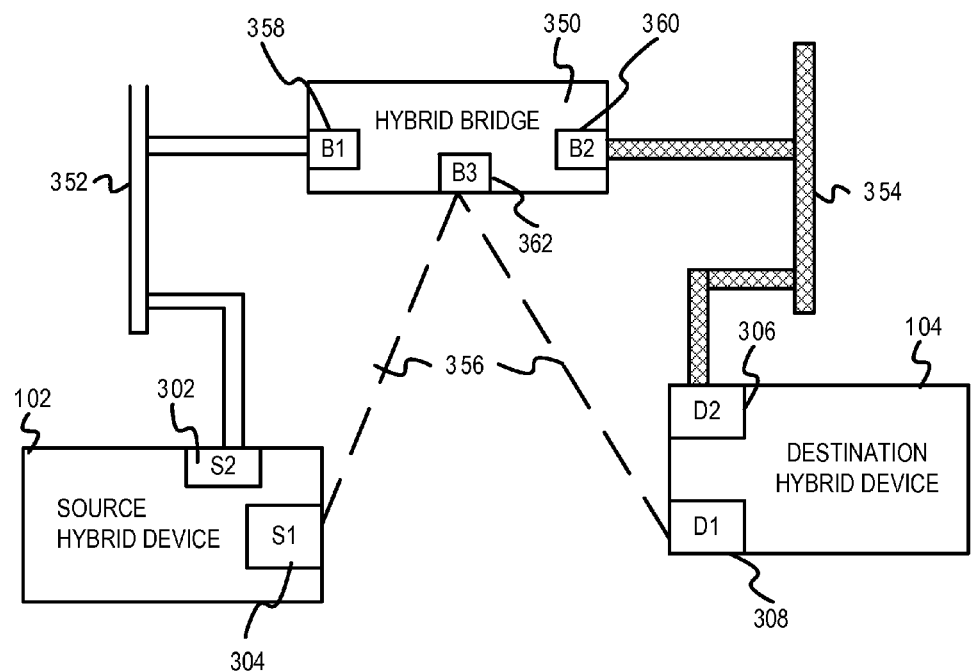
FIG. 3B is an example conceptual diagram illustrating a plurality of network paths between a source hybrid device and a destination hybrid device via a forwarding device.

In some implementations, one of the four network paths 310, 312, 314, and 316 can be selected as the preferred network path depending on the type of packet being transmitted (e.g., based on the packet classification, as will be described in FIG. 4), based on the networking technologies used in each network path, based on whether some of the network paths include conventional bridge devices connecting the source hybrid device 102 and the destination hybrid device 104, etc. In other implementations, the preferred network path may be selected based, at least in part, on the topology of the hybrid communication network 100, link quality characteristics (e.g., Quality of service or QoS) of communication links in the hybrid communication network 100, number of available network paths between the source hybrid device 102 and the destination hybrid device 104, the presence of forwarding devices between the source and the destination hybrid devices (e.g., conventional bridge devices in one or more of the network paths), the communication protocols supported by the source and the destination hybrid devices, and various other factors. Referring to FIG. 3B, the source hybrid device 102 is coupled to the destination hybrid device 104 via a hybrid bridge 350. As depicted in FIG. 3B, the source hybrid device 102 comprises two communication interfaces 302 and 304, while the destination hybrid device 104 comprises two communication interfaces 306 and 308. In the example of FIG. 3B, the hybrid bridge 350 comprises three communication interfaces 358, 360, and 362. The hybrid communication network of FIG. 3B comprises an interconnection of three communication networks—a powerline communication network 352, an Ethernet network 354, and a wireless communication network 356. In FIG. 3B, the source hybrid device 102 and the hybrid bridge 350 are coupled with the powerline communication network 352 via interfaces 302 and 358 respectively. The destination hybrid device 104 and the hybrid bridge 350 are coupled with the Ethernet network 354 via interfaces 306 and 360 respectively. Lastly, the source hybrid device 102, the destination hybrid device 104, and the hybrid bridge 350 are coupled with the wireless communication network 356 via interfaces 304, 308, and 362 respectively. The address selection unit 106 can select the preferred network path based one or more of the factors described above (e.g., knowledge of the topology of the hybrid communication network 100). Referring back to FIG. 2, the flow continues at block 206.

At block 206, a source communication interface associated with the hybrid device is selected. In one implementation, as described above in FIG. 1, the address selection unit 106 can select the source communication interface based, at least in part, on the preferred network path determined at block 204. The address selection unit 106 may also select the source communication interface from multiple communication interfaces associated with the source hybrid device 102 based, at least in part, on knowledge of the communication network topology and the preferred network path. In another implementation, the address selection unit 106 can select the source communication interface based on a traffic load associated with each of the communication interfaces associated with the source hybrid device 102, the type of packet (e.g., video packet, audio packet, etc.) to be transmitted, and various other packet characteristics. The flow continues at block 208.

At block 208, a destination communication interface is selected based, at least in part, on the preferred network path. For example, the address selection unit 106 can select the destination communication interface based, at least in part, on the preferred network path determined at block 204. As described above with reference to FIG. 1, the address selection unit 106 can also select the destination communication interface from multiple communication interfaces associated with the destination hybrid device 104 based, at least in part, on knowledge of the communication network topology and the preferred network path. The flow continues at block 210.

At block 210, a source address that corresponds to the source communication interface is determined. In one implementation, the address selection unit 106 can determine that the source MAC address is the MAC address that corresponds to the source communication interface (selected at block 206) and the preferred network path (selected at block 204). In another implementation, the address selection unit 106 can select the source MAC address to be a predetermined MAC address assigned to one of the multiple communication interfaces associated with the source hybrid device 102, irrespective of the source communication interface that will be used to transmit the packet (determined at block 206). In another implementation, the address selection unit 106 can select (as the source MAC address) a predetermined address previously assigned to the source hybrid device 102, where the predetermined address is not assigned to any of the communication interfaces associated with the source hybrid device 102. In some implementations, the address selection unit 106 can select the source MAC address from multiple MAC addresses associated with the source hybrid device 102 to ensure that the selected source MAC address is received at an appropriate "learned" port of intermediate conventional learning bridges (along the preferred network path). It is noted that in other implementations, the address selection unit 106 may not determine the MAC address associated with the source hybrid device 102, but may instead determine other suitable types of addresses depending on the communication protocols implemented by the source hybrid device 102. The flow continues at block 212.

At block 212, a destination address that corresponds to the destination communication interface is determined. For example, the address selection unit 106 can determine that the destination MAC address is the MAC address that corresponds to the destination communication interface (selected at block 208). In one implementation, the address selection unit 106 can determine the destination MAC address based on communications previously received from the same destination communication interface (determined at block 208) associated with the destination hybrid device 104. For example, the address selection unit 106 can analyze address fields within one or more packets received from the destination hybrid device 104 to determine the destination MAC addresses. Alternately, the address selection unit 106 can employ various techniques to discover the communication interfaces associated with the destination hybrid device 104 and consequently to discover the destination MAC addresses. In one implementation, the address selection unit 106 can receive one or more discovery announcement messages that indicate the MAC addresses associated with the destination hybrid device 104. In another implementation, the address selection unit 106 can initiate protocol exchange sequences (e.g., address resolution protocol (ARP)) and can examine one or more ARP response messages received from the destination hybrid device 104 to determine the MAC addresses associated with the destination hybrid device 104. The address selection unit 106 can select the MAC address that corresponds to the destination communication interface (determined at block 208) and the preferred network path as the destination MAC address. It is noted that in other implementations, the address selection unit 106 may not determine the MAC address associated with the destination hybrid device 104, but may instead determine other suitable types of addresses depending on the communication protocols implemented by the source hybrid device 102. The flow continues at block 214.

At block 214, an original source address and an original destination address are determined. For example, the address selection unit 106 can read the original source MAC address and the original destination MAC address from the packet received at block 202. In some implementations, the source MAC address field and the destination MAC address field may comprise values inserted by upper layer protocols associated with the source hybrid device 102 (e.g., by the application that generated the packet, by a network protocol layer, etc.). In other implementations, the source MAC address field and the destination MAC address field may not comprise any values. In other words, the original source MAC address and the original destination MAC address may comprise a NULL value. The address selection unit 106 can attempt to ensure that the values in the source and destination MAC address fields are in accordance with at least the preferred network path and the destination communication interface, as will be further described in blocks 216-218. The flow continues at block 216.

At block 216, it is determined whether the original addresses correspond to the addresses associated with the selected communication interfaces. For example, the address selection unit 106 can determine whether the original source MAC address matches the source MAC address (determined at block 210) associated with the selected source communication interface. The address selection unit 106 can also determine whether the original destination MAC address matches the destination MAC address (determined at block 212) associated with the selected destination communication interface. In comparing the original MAC addresses with the MAC addresses associated with the selected communication interfaces, the address selection unit 106 can ensure that the source MAC address is consistent with the source communication interface from which the source hybrid device 102 will transmit the packet and that the destination MAC address is consistent with the preferred network path and the destination communication interface at which the destination hybrid device 104 will receive the packet. If it is determined that both the original source and destination addresses are equal to the corresponding addresses associated with the selected communication interfaces, the flow continues at block 220. Otherwise, the flow continues at block 218.

At block 218, the source address field and/or the destination address field are respectively populated with the source address and the destination address that correspond to the selected communication interface. For example, in response to determining that the original source MAC address does not match the source MAC address that corresponds to the selected source communication interface, the address selection unit 106 can overwrite the source address field of the packet with the source MAC address that corresponds to the selected source communication interface. Likewise, in response to determining that the original destination MAC address does not match the destination MAC address that corresponds to the selected destination communication interface, the address selection unit 106 can overwrite the destination address field of the packet with the destination MAC address that corresponds to the selected destination communication interface. Furthermore, as described above in FIG. 1, the address selection unit 106 can also ensure that the source IP address, the destination IP address, the source device identifier, and the destination device identifier are consistent with the values assigned to the source hybrid device 102 and the destination hybrid device 104. The flow continues at block 220.

At block 220, the packet is transmitted to the destination hybrid device via the preferred network path. For example, the routing unit 108 can transmit (or can cause a transceiver unit to transmit) the packet comprising the source MAC address that corresponds to the selected source communication interface and the destination MAC address that corresponds to the selected destination communication interface to the destination hybrid device 104. Referring to FIG. 3A, if the source hybrid device 102 determines to transmit the packet via path (S2, D2) 316, the source hybrid device 102 can populate address fields of the packet with the MAC address of the source communication interface 302 and the MAC address of the destination communication interface 308 respectively. Referring now to FIG. 3B, the source hybrid device 102 can transmit the packet from the source communication interface 302 via the powerline communication network 352; the hybrid bridge 350 can receive the packet on the bridge interface 358 and forward the packet to the destination hybrid device 104 from the bridge interface 360 via the Ethernet communication network 354. The destination hybrid device 104 can receive the packet on the destination communication interface 306. Referring back to FIG. 2, from block 220, the flow ends.

In some implementations, transmitted packets can be classified based on one or more packet characteristics and corresponding route information can be stored. The stored route information can be employed to route subsequent packets associated with the same packet classification, as will be described in FIG. 4.

Figure 4:
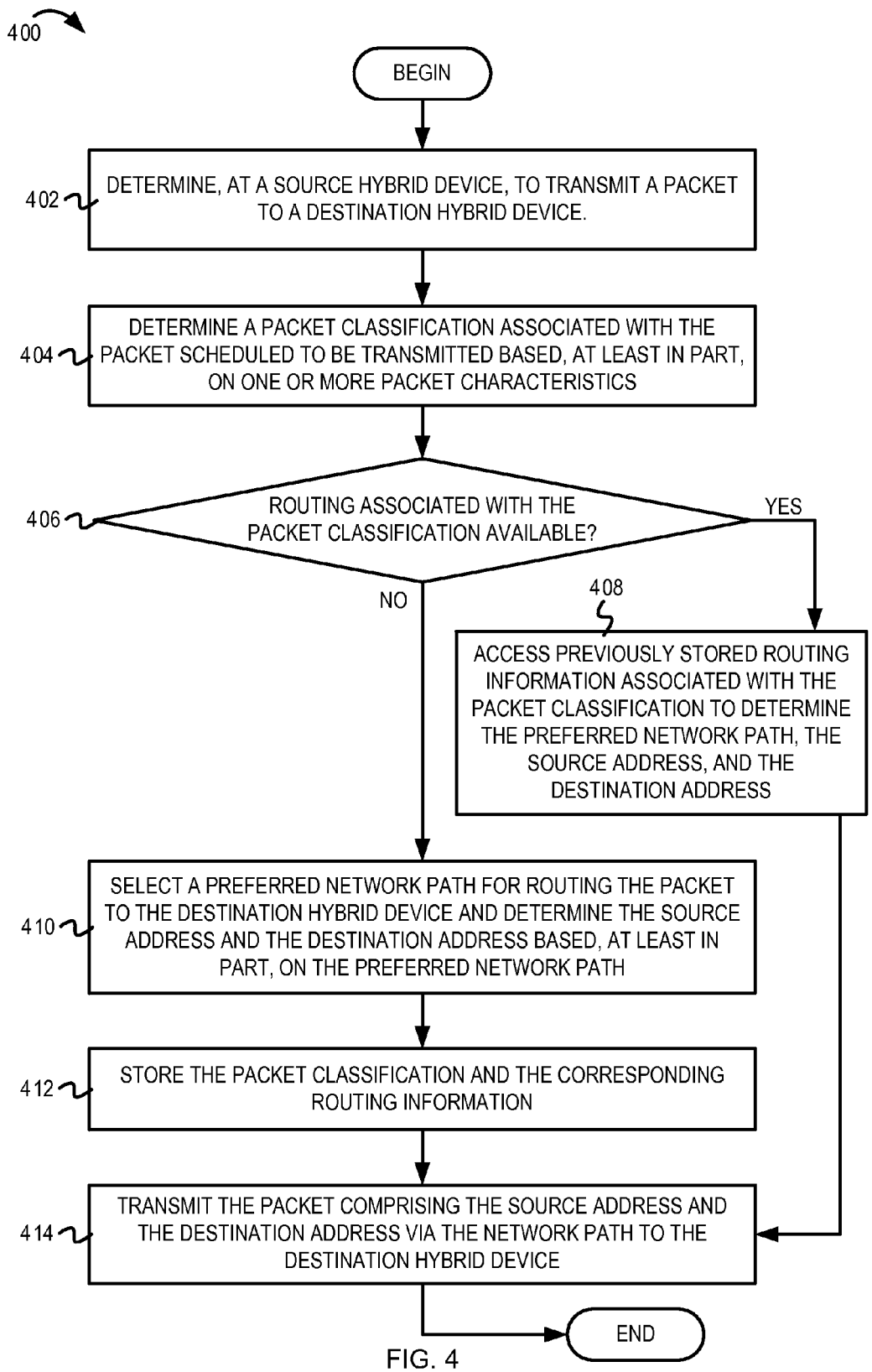
FIG. 4 is a flow diagram illustrating example operations of a packet-classification based addressing scheme for hybrid communication networks.

FIG. 4 is a flow diagram 400 illustrating example operations of a packet-classification based addressing scheme for hybrid communication networks. The flow 400 begins at block 402.

At block 402, a source hybrid device determines to transmit a packet to a destination hybrid device. In the example of FIG. 1, the routing unit 108 of the source hybrid device 102 can determine to transmit the packet to the destination hybrid device 104. The flow continues at block 404.

At block 404, a packet classification associated with the packet scheduled to be transmitted is determined based, at least in part, on one or more packet characteristics. For example, the address selection unit 106 can determine the packet classification associated with the packet scheduled to be transmitted to the destination hybrid device 104. In some implementations, the address selection unit 106 can read one or more fields within the packet (determined at block 402) and can determine one or more packet characteristics associated with the packet. The packet characteristics can include the upper protocol layer destination address (e.g., the destination IP address), the upper protocol layer source address (e.g., the source IP address), a lower protocol layer destination address (e.g., the original destination MAC address), a lower protocol layer source address (e.g., the original source MAC address), the priority of the packet, the importance/urgency (or acceptable latency) associated with the packet, a type of packet (e.g., a video packet, a voice packet, etc.), etc. For example, packets that are encoded using a particular encoding scheme (e.g., MPEG packets) may be associated with the same packet classification. The packet characteristics may also be indicative of the communication protocol in which the packet is being transmitted, a communication port from which the packet will be transmitted, and a communication network (e.g., powerline network, Ethernet network, etc.) in which the packet will be transmitted. In some implementations, the packet characteristics may indicate whether the packet is part of a stream of packets, whether the packet is part of a periodic transmission, etc. The address selection unit 106 may also classify packets according to application "streams." For example, packets received from a particular application can be associated with the same packet classification. In some implementations, as will be described below in FIG. 4, the packet classification can be tied to routing information including the preferred network path, the source and destination communication interfaces, the source and destination MAC addresses, etc., and can be used in subsequent preferred network path selection decisions for improving consistency of packet delivery, minimizing arrival jitter, and reducing out-of-order delivery. The flow continues at block 406.

At block 406, it is determined whether routing information associated with the packet classification (determined in block 404) is available. As described above, in some implementations, the routing unit 108 can store previously determined route information associated with one or more packet classifications in a packet classification data structure. At block 406, the routing unit 108 can access the packet classification data structure to determine whether the packet classification and the corresponding routing information associated with the packet (detected at block 402) is available. If it is determined that the routing information associated with the packet classification is available, the flow continues at block 408. Otherwise, the flow continues at block 410.

At block 408, previously stored routing information associated with the packet classification is accessed to determine the preferred network path, the source address, and the destination address. The flow 400 moves from block 406 to block 408 if it is determined that the routing information associated with the packet classification is available. As described above, the address selection unit 106 can assign a different packet classification to different packets depending on one or more packet characteristics. The address selection unit 106 can also assign a different preferred network path to the packets based on their packet classification. In response to determining that the routing information associated with the packet classification was previously stored, the address selection unit 106 can access the routing information associated with the packet classification to determine the preferred network path, the source communication interface, the destination communication interface, the source MAC address, and the destination MAC address. Using previously stored routing information based on packet classification can minimize packet processing time and can also prevent communication disruptions (e.g., dropped packets at the destination hybrid device 104 or at an intermediate forwarding device) by transmitting end-to-end traffic (e.g., from one application to another application) along the same preferred network path. The flow continues at block 414.

At block 410, a preferred network path is selected for routing the packet to the destination hybrid device, and the source address and the destination address are determined based, at least in part, on the preferred network path. The flow 400 moves from block 406 to block 410 if it is determined that the routing information associated with the packet classification is not available. For example, the routing unit 108 can select the preferred network path for routing the packet to the destination hybrid device 104, in accordance with operations described above in FIG. 1 and in block 204 of FIG. 2. The address selection unit 106 can then determine the source communication interface, the destination communication interface, the source MAC address, and the destination MAC address based, at least in part, on the preferred network path, as described above in FIG. 1 and blocks 206-212 of FIG. 2. The flow continues at block 412.

At block 412, the packet classification and the corresponding routing information is stored. For example, the address selection unit 106 can store the packet classification and the corresponding routing information. The routing information can comprise an indication of the preferred network path, the source and the destination communication interfaces, and the source and the destination MAC addresses. For instance, using a data type based classification scheme, the address selection unit 106 can indicate that video packets should be routed via a first preferred network path, that voice packets should be routed via a second preferred network path, etc. On subsequently detecting a packet with the same packet classification, the source hybrid device 102 can populate address fields of the packet and route the packet in accordance with the stored routing information. For example, in response to subsequently receiving another video packet, the routing unit 108 can determine to route the video packet via the first preferred network path. The flow continues at block 414.

At block 414, the packet comprising the source address and the destination address are transmitted via the preferred network path to the destination hybrid device. For example, the routing unit 108 can transmit (or can cause a transceiver unit to transmit) the packet comprising the source MAC address and the destination MAC address to the destination hybrid device 104. From block 414, the flow ends.

It should be understood that FIGS. 1-4 are examples meant to aid in understanding embodiments and should not be used to limit embodiments or limit scope of the claims. Embodiments may perform additional operations, fewer operations, operations in a different order, operations in parallel, and some operations differently. Although, FIGS. 1-4 describe an addressing scheme for hybrid devices that implement the OSI protocol stack, embodiments are not so limited. In other implementations, the addressing scheme can be extended to hybrid devices that employ other suitable protocol stack architectures. Additionally, although FIGS. 1-4 describe the address selection unit 106 selecting an appropriate source MAC address and destination MAC address, embodiments are not so limited. In other embodiments, the address selection unit 106 may not select source and destination MAC addresses but may select other suitable addresses depending on the communication protocols implemented by the hybrid devices and based on network architecture employed at the hybrid devices.

It is noted that, in other embodiments, instead of or in addition to the techniques described above in block 212 of FIG. 2, the address selection unit 106 can employ various other techniques for determining the destination MAC address. In some implementations, the address selection unit 106 can select the destination MAC address to be a predetermined MAC address assigned to one of the multiple communication interfaces associated with the destination hybrid device 104, irrespective of the destination communication interface on which the packet will be received or the network path on which the packet will be transmitted. In another implementation, the address selection unit 106 can select (as the destination MAC address) a predetermined address previously assigned to the destination hybrid device 104, where the predetermined address is not assigned to any of the communication interfaces associated with the destination hybrid device 104. In another implementation, the address selection unit 106 can select the destination MAC address from multiple MAC addresses associated with the destination hybrid device 104 to ensure that the selected destination MAC address is received at an appropriate "learned" port of intermediate conventional learning bridges (along the preferred network path). In another implementation, the destination MAC address can be selected based on previously determined associations between various other types of addresses (e.g., an IP address) associated with the destination hybrid device 104.

Although the Figures depict the source hybrid device 102 selecting the source communication interface and the destination communication interface based on the preferred network path between the source hybrid device 102 and the destination hybrid device 104, embodiments are not so limited. In other embodiments, the source hybrid device 102 can first select the source communication interface and the destination communication interface and can then determine the preferred network path based on the selected source communication interface and the destination communication interface. For example, the source hybrid device 102 can select the first link in a complete network path for routing the packet by identifying a MAC/PHY interface from which to transmit the packet onto the hybrid communication network and by ensuring that the source address field in the packet is consistent with this selection. The source hybrid device 102 can then select the last link in the complete network path for routing the packet by identifying a destination MAC/PHY interface at which the packet is expected to arrive at the destination hybrid device 104 and by ensuring that the destination address field in the packet is consistent with this selection. The source hybrid device 102 can then select the preferred network path in accordance with the selected source and the destination communication interfaces. With reference to the example of FIG. 3A, the source hybrid device 102 may determine that the packet should be transmitted via communication interface 304 of the source hybrid device 102 and that the packet will be received at communication interface 308 of the destination hybrid device 104. Consequently, the source hybrid device 102 can identify the network path 312 as the preferred network path.

Although not depicted with reference to FIG. 4, the hybrid device 102 can also use the packet classification to determine the amount of traffic associated with each of the packet classifications and packet streams. For example, the hybrid device 102 may determine that the packet (received at block 402) is part of a video stream. The hybrid device 102 can assign the packet a corresponding packet classification (e.g., based on the upper protocol layer destination address (e.g., the destination IP address), the upper protocol layer source address (e.g., the source IP address), a lower protocol layer destination address (e.g., the original destination MAC address), a lower protocol layer source address (e.g., the original source MAC address), the priority associated with the packet, the latency associated with the packet, the type of packet, etc.) and can assign the packet to an appropriate transmission stream (e.g., the source communication interface) for transmission via the corresponding preferred network path. The hybrid device 102 can analyze the traffic associated with each of the transmission streams to determine the traffic load and the throughput associated with the transmission stream. In some implementations, the hybrid device 102 can execute load balancing operations based on the traffic load and the throughput associated with the transmission streams. For example, if it is determined that the preferred network path associated with video streams has a high traffic load, the hybrid device 102 can execute load balancing operations to split the video packets across multiple network paths. When executing the load balancing operations, the hybrid device 102 can ensure that packets generated by a particular application are associated with the same packet classification and are transmitted via the same preferred network path to minimize/avoid out of order arrival, jitter, etc.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider)

Figure 5:
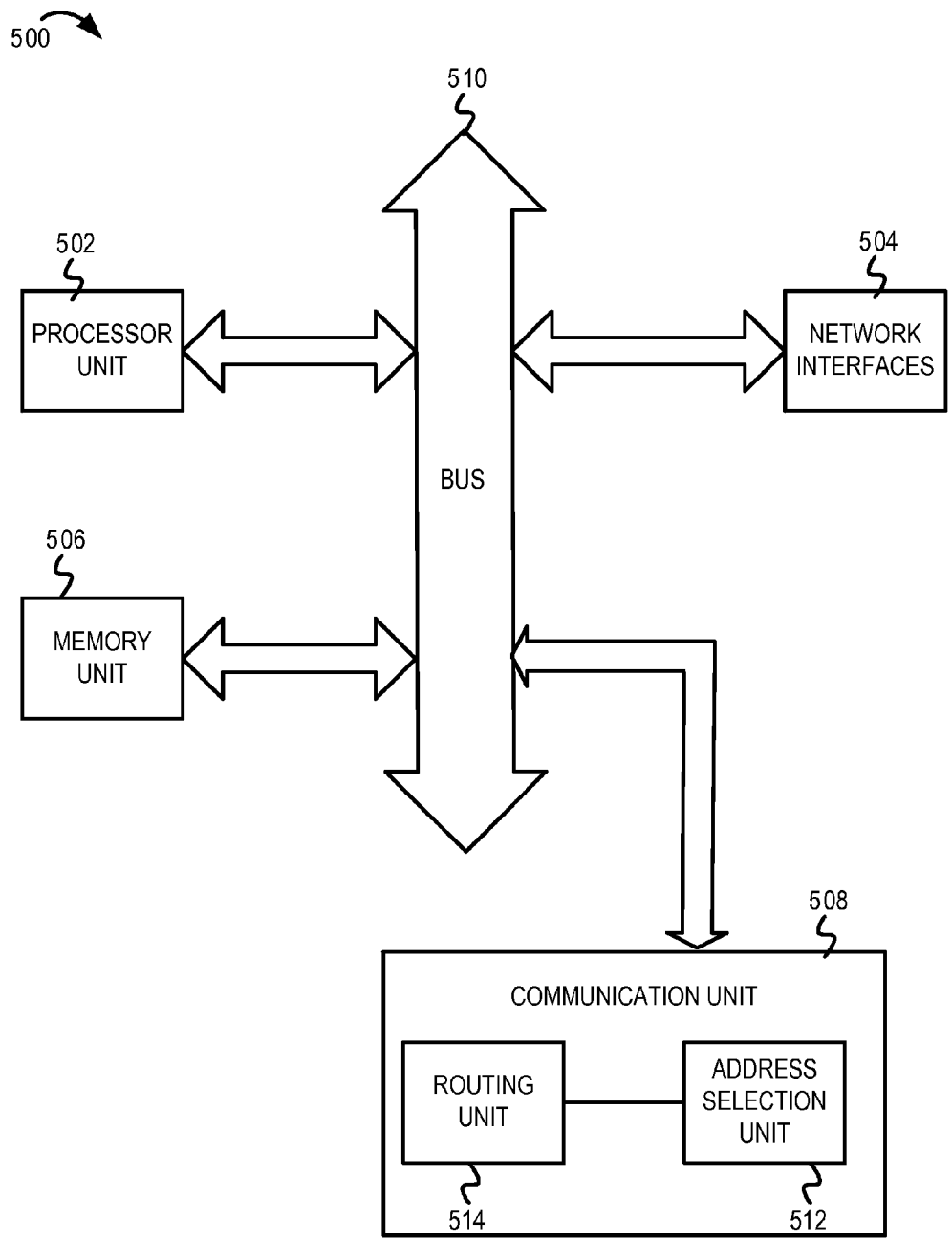
FIG. 5 is a block diagram of one embodiment of an electronic device including an addressing scheme for a hybrid communication network.

FIG. 5 is a block diagram of one embodiment of an electronic device 500 including an addressing scheme for a hybrid communication network. In some implementations, the electronic device 500 may be one of a laptop computer, a netbook, a mobile phone, a powerline communication device, a personal digital assistant (PDA), or other electronic systems comprising functionality to communicate across multiple communication networks (which form the hybrid communication network). The electronic device 500 includes a processor unit 502 (possibly including multiple processors, multiple cores, multiple nodes, and/or implementing multi-threading, etc.). The electronic device 500 includes a memory unit 506. The memory unit 506 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 500 also includes a bus 510 (e.g., PCI, ISA, PCI-Express, HyperTransport®, InfiniBand®, NuBus, AHB, AXI, etc.), and network interfaces 504 that include at least one of a wireless network interface (e.g., a WLAN interface, a Bluetooth® interface, a WiMAX interface, a ZigBee® interface, a Wireless USB interface, etc.) and a wired network interface (e.g., a powerline communication interface, an Ethernet interface, etc.). In some implementations, the electronic device 500 can comprise a plurality of network interfaces—each of which couples the electronic device 500 to a different communication network. For example, the electronic device 500 can comprise a powerline communication interface and a WLAN interface that couple the electronic device 500 with a powerline communication network and a wireless local area network respectively.

The electronic device 500 also includes a communication unit 508. The communication unit 508 comprises an address selection unit 512 and a routing unit 514. As described above in FIGS. 1-4, the communication unit 508 implements functionality to select one of a plurality of network paths to transmit a packet from the electronic device 500 to a destination device. Based on the selected network path, the communication unit 508 can also select one of a plurality of source network interfaces from which the packet will be transmitted and one of a plurality of destination network interfaces on which the packet is expected to be received at the destination device. The communication unit 508 can identify a source MAC address and a destination MAC address that correspond to the selected source network interface and the selected destination network interface respectively. The communication unit 508 can insert the identified source MAC address and the destination MAC address into the packet and can transmit the packet to the destination device via the selected network path.

Any one of these functionalities may be partially (or entirely) implemented in hardware and/or on the processor unit 502. For example, the functionality may be implemented with an application specific integrated circuit, in logic implemented in the processor unit 502, in a co-processor on a peripheral device or card, etc. Further, realizations may include fewer or additional components not illustrated in FIG. 5 (e.g., video cards, audio cards, additional network interfaces, peripheral devices, etc.). The processor unit 502, the memory unit 506, and the network interfaces 506 are coupled to the bus 510. Although illustrated as being coupled to the bus 510, the memory unit 506 may be coupled to the processor unit 502.

While the embodiments are described with reference to various implementations and exploitations, it will be understood that these embodiments are illustrative and that the scope of the inventive subject matter is not limited to them. In general, an addressing scheme for hybrid communication networks as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method performed by a first network device, the method comprising:
   determining to transmit a first packet from the first network device to a second network device of a communication network, wherein the first packet includes an original source media access control (MAC) address;
   selecting a first network path for transmitting the first packet from a first source communication interface of the first network device to a first destination communication interface of the second network device;
   determining a first source MAC address of the first source communication interface of the first network device based, at least in part, on the first network path;
   replacing the original source MAC address with the first source MAC address in the first packet in response to determining that the first source MAC address does not match the original source MAC address; and
   transmitting the first packet, including the first source MAC address, via the first network path.

2. The method of claim 1, further comprising:
   selecting a first classification category for the first packet based, at least in part, on a first characteristic of the first packet; and
   associating the first network path with the first classification category.

3. The method of claim 2, further comprising:
   determining to transmit a second packet from the first network device to the second network device;
   determining that the second packet is associated with the first classification category based, at least in part, on a second characteristic of the second packet; and
   selecting the first network path for transmitting the second packet from the first source communication interface of the first network device to the first destination communication interface of the second network device based, at least in part, on determining that the second packet is associated with the first classification category.

4. The method of claim 2, wherein the first characteristic of the first packet comprises at least one member of a group consisting of an upper protocol layer destination address, an upper protocol layer source address, a lower protocol layer destination address, a lower protocol layer source address, a priority associated with the first packet, a latency associated with the first packet, a packet type, a communication protocol to be used for transmitting the first packet, a communication port from which the first packet will be transmitted, the communication network via which the first packet will be transmitted, and an application that generated the first packet.

5. The method of claim 1,
   wherein said determining the first source MAC address further comprises
      selecting the first source communication interface based at least in part on the first network path.

6. The method of claim 1, wherein selecting the first network path further comprises:
   selecting the first network path based, at least in part, traffic loads associated with interfaces of the first network device and the second network device.

7. The method of claim 1, further comprising:
   detecting, from the first packet, an original destination MAC address associated with the second network device;
   determining a new destination MAC address of the first destination communication interface of the second network device based, at least in part, on the first network path; and
   overwriting the original destination MAC address with the new destination MAC address in response to determining that the new destination MAC address does not match the original destination MAC address.

8. The method of claim 1, wherein said determining the first source MAC address further comprises one of:
   selecting a first of a plurality of MAC addresses associated with the first source communication interface of the first network device as the first source MAC address,
   selecting a predetermined MAC address associated with the first network device as the first source MAC address, wherein the predetermined MAC address is different from any of a plurality of MAC addresses associated with a plurality of interfaces of the first network device,
selecting the first source MAC address based, at least in part, on mappings among a plurality of MAC addresses associated with the first network device, and
selecting the first source MAC address from the plurality of MAC addresses associated with the first network device based, at least in part, on a routing algorithm associated with the first network device and a topology of the communication network.

9. The method of claim 1, further comprising:
determining a destination MAC address for the first destination communication interface, wherein said determining the destination MAC address comprises at least one member of a group consisting of:
selecting a first of a plurality of MAC addresses associated with the first destination communication interface of the second network device as the destination MAC address,
selecting a predetermined MAC address associated with the second network device as the destination MAC address, wherein the predetermined MAC address is different from any of a plurality of MAC addresses associated with a plurality of interfaces of the second network device,
selecting the destination MAC address based, at least in part, on mappings among a plurality of MAC addresses associated with the second network device, and
selecting the destination MAC address from the plurality of MAC addresses associated with the second network device based, at least in part, on a routing algorithm associated with the second network device and a topology of the communication network.

10. The method of claim 1, further comprising:
discovering a plurality of MAC addresses associated with the first destination communication interface of the second network device, wherein
discovering the plurality of MAC addresses associated with the first destination communication interface comprises at least one member of a group consisting of:
receiving, from the second network device, a discovery announcement packet that comprises an indication of at least one of the plurality of MAC addresses associated with the first destination communication interface of the second network device,
analyzing an address field associated with a communication packet received from the second network device to determine at least one of the plurality of MAC addresses associated with the first destination communication interface of the second network device, and
requesting, from the second network device, the indication of at least one of the plurality of MAC addresses associated with the first destination communication interface of the second network device; and
determining a destination MAC address for the first destination communication interface based at least in part on the plurality of MAC addresses associated with the first destination communication interface.

11. A first communication device comprising:
a first source communication interface;
a processor; and
memory to store instructions, which when executed by the processor, cause the first communication device to:
determine to transmit a first packet from the first communication device to a second communication device, wherein the first packet includes an original source media access control (MAC) address
select a first network path for transmitting the first packet from the first source communication interface of the first communication device to a first destination communication interface of the second communication device;
determine a first source MAC address of the first source communication interface of the first communication device based, at least in part, on the first network path;
replace the original source MAC address with the first source MAC address in the first packet in response to determining that the first source MAC address does not match the original source MAC address; and
transmit the first packet, including the first source MAC address, via the first network path.

12. The first communication device of claim 11, wherein the instructions, when executed by the processor, cause the first communication device to:
select a first classification category for the first packet based, at least in part, on a first characteristic of the first packet; and
associate the first network path with the first classification category.

13. The first communication device of claim 12, wherein the instructions, when executed by the processor, cause the first communication device to:
determine to transmit a second packet from the first communication device to the second communication device;
determine that the second packet is associated with the first classification category based, at least in part, on a second characteristic of the second packet; and
select the first network path for transmitting the second packet from the first source communication interface to the first destination communication interface based, at least in part, on determining that the second packet is associated with the first classification category.

14. The first communication device of claim 11, wherein the instructions, when executed by the processor, cause the first communication device to:
determine the first source MAC address of the first source communication interface by selecting the first source communication interface based at least in part on the first network path.

15. The first communication device of claim 11, wherein the Instructions, when executed by the processor, cause the first communication device to select the first network path based, at least in part, on traffic loads associated with interfaces of the first communication device and the second communication device.

16. The first communication device of claim 11, wherein the instructions to cause the first communication device to determine the first source MAC address of the first source communication interface further comprises instructions which, when executed by the processor, cause the first communication device to:
select a first of a plurality of MAC addresses associated with the first source communication interface of the first communication device as the first source MAC address, or
select a predetermined MAC address associated with the first communication device as the first source MAC address, wherein the predetermined MAC address is different from any of a plurality of MAC addresses associated with a plurality of interfaces of the first communication device.

17. The first communication device of claim 11, wherein the instructions, when executed by the processor, cause the first communication device to:
discover a plurality of MAC addresses associated with the first destination communication interface of the second communication device, wherein the instructions to cause the first communication device to discover the plurality of MAC addresses comprises at least one instruction from a group consisting of instructions to:
receive, from the second communication device, a discovery announcement packet that comprises an indication of at least one of a plurality of MAC addresses associated with the first destination communication interface of the second communication device,
analyze an address field associated with a communication packet received from the second communication device to determine at least one of the plurality of MAC addresses associated with the first destination communication interface of the second communication device, and
request, from the second communication device, the indication of at least one of the plurality of MAC addresses associated with the first destination communication interface of the second communication device; and
determine a destination MAC address for the first destination communication interface based at least in part on the plurality of MAC addresses associated with the first destination communication interface.

18. A non-transitory machine-readable storage medium having instructions stored therein which, when executed by a processor causes the processor to perform operations that comprise:
determining to transmit a first packet from a first network device to a second network device of a communication network, wherein the first packet includes an original source media access control (MAC) address;
selecting a first network path for transmitting the first packet from a first source communication interface of the first network device to a first destination communication interface of the second network device;
determining a first source MAC address of the first source communication interface of the first network device based, at least in part, on the first network path;
replacing the original source MAC address with the first source MAC address in the first packet in response to determining that the first source MAC address does not match the original source MAC address; and
transmitting the first packet, including the first source MAC address, via the first network path.

19. The non-transitory machine-readable storage medium of claim 18, wherein:
said operation of determining the first source MAC address further comprises:
selecting the first source communication interface based at least in part on the first network path.

20. The non-transitory machine-readable storage medium of claim 18,
wherein said operation of selecting the first network path further comprises:
selecting the first network path based, at least in part, on traffic loads associated with interfaces of the first network device and the second network device.

21. The non-transitory machine-readable storage medium of claim 18, wherein said operation of determining the first source MAC address further comprises one of:
selecting a first of a plurality of MAC addresses associated with the first source communication interface of the first network device as the first source MAC address,
selecting a predetermined MAC address associated with the first network device as the first source MAC address, wherein the predetermined MAC address is different from any of the plurality of MAC addresses associated with a plurality of interfaces of the first network device,
selecting the first source MAC address based, at least in part, on mappings among a plurality of MAC addresses associated with the first network device, and
selecting the first source MAC address from the plurality of MAC addresses associated with the first network device based, at least in part, on a routing algorithm associated with the first network device and a topology of the communication network.

22. The non-transitory machine-readable storage medium of claim 18, wherein the instructions cause the processor to perform further operations that comprise:
discovering a plurality of MAC addresses associated with the first destination communication interface of the second network device, wherein discovering the plurality of MAC addresses associated with the first destination communication interface comprises at least one member of a group consisting of:
receiving, from the second network device, a discovery announcement packet that comprises an indication of at least one of a plurality of MAC addresses associated with the first destination communication interface of the second network device,
analyzing an address field associated with a communication packet received from the second network device to determine at least one of the plurality of MAC addresses associated with the first destination communication interface of the second network device, and
requesting, from the second network device, the indication of at least one of the plurality of MAC addresses associated with the first destination communication interface of the second network device; and
determining a destination MAC address for the first destination communication interface based at least in part on the plurality of MAC addresses associated with the first destination communication interface.

23. The method of claim 1,
wherein the first network device comprises the first source communication interface associated with a first networking technology and a second source communication interface associated with a second networking technology, and
wherein the first source communication interface associated with the first networking technology of the first network device is communicatively coupled with the first destination communication interface of the second network device via the first network path, and is communicatively coupled with a second destination communication interface of the second network device via a second network path.

24. The method of claim 23, wherein:
the second source communication interface associated with the second networking technology of the first network device is communicatively coupled with the first destination communication interface of the second network device via a third network path, and is communicatively coupled with the second destination communication interface of the second network device via a fourth network path.

25. The method of claim 24, wherein a third networking technology associated with the first destination communication interface of the second network device is different than a fourth networking technology associated with the second destination communication interface of the second network device.

26. The method of claim 1, further comprising:
determining that the first packet is associated with a first classification category based, at least in part, on a communication protocol to be used for transmitting the first packet; and
selecting the first network path from a plurality of network paths based, at least in part, on determining that the first packet is associated with the first classification category.

27. The method of claim 1, further comprising:
determining that the first packet is associated with a first classification category based, at least in part, on a latency of the first packet; and
selecting the first network path from a plurality of network paths based, at least in part, on determining that the first packet is associated with the first classification category.

28. The method of claim 1, further comprising:
determining that the first packet is associated with a first classification category based, at least in part, on a priority of the first packet; and
selecting the first network path from a plurality of network paths based, at least in part, on determining that the first packet is associated with the first classification category.

29. The method of claim 1, wherein said selecting the first network path is based, at least in part, on a communication protocol supported by the first network device and the second network device.

\* \* \* \* \*